United States Patent [19]
Innes et al.

[11] 3,710,613
[45] Jan. 16, 1973

[54] FLOAT OPERATED SIGNALLING DEVICE

[75] Inventors: Robert Innes, Beaconsfield, Buckinghamshire; Ernest Albert Morrison, Gerrards Cross, both of England

[73] Assignee: Roland Trist Controls Limited, Slough, Buckinghamshire, England

[22] Filed: April 26, 1971

[21] Appl. No.: 137,444

[30] Foreign Application Priority Data

May 8, 1970   Great Britain.....................22,396/70

[52] U.S. Cl......................73/1 R, 73/DIG. 5, 73/319, 340/410
[51] Int. Cl............................G08b 29/00, G01f 25/00
[58] Field of Search........73/1 R, 305, 307, 314, 319, 73/322.5, 313, DIG. 5; 340/410

[56] References Cited

UNITED STATES PATENTS

| | | |
|---|---|---|
| 2,370,099 | 2/1945 | Werder.........................340/410 UX |
| 2,547,526 | 4/1951 | Hilliard.........................340/410 UX |
| 2,588,761 | 3/1952 | Raby.............................340/410 UX |
| 2,798,214 | 7/1957 | Rowell................................340/410 |
| 3,014,205 | 12/1961 | Boehm................................340/410 |
| 3,060,717 | 10/1962 | Howe......................................73/1 R |

*Primary Examiner*—Louis R. Prince
*Assistant Examiner*—Joseph W. Roskos
*Attorney*—Holcombe, Wetherill & Brisebois

[57] ABSTRACT

The invention is concerned with a float operated signalling device in which a magnet follows the movement of a float in a closed liquid container, the magnet reciprocating in a non magnetic tube through which it operates signal controls. An auxiliary liquid supply is connected to the tube for providing a temporary hydraulic pressure differential across the piston or a part attached to the piston so that the float is dunked below the liquid level and the magnet operates the signal controls for test purposes.

9 Claims, 2 Drawing Figures

FLOAT OPERATED SIGNALLING DEVICE

The invention is concerned with float operated signalling devices, such as electrical or pneumatic switches or proportional controls, for use in sensing the liquid level in a container, such as a boiler, and possibly controlling automatically some related function such as the supply of liquid to the container or the firing of the boiler. The device is of the kind having a float which follows changes in the liquid level in the container, the float being mechanically connected to a magnet which thus follows the movement of the float and is movable to and fro along inside a tube, made of non-magnetic material, the interior of which is in communication with the interior of the container. Magnetically operated switch contacts or other signal controls are mounted on the outside of the tube and are actuated by the changing magnetic field emanating from the magnet as the magnet moves along the tube.

It is desirable, with this type of system, to be able to test whether the device is functional particularly if it incorporates a switch used as a low level alarm or a burner cut out. For test purposes it is necessary to move the magnet along the tube, and consequently move the float into the liquid, without necessarily changing the liquid level. A previous proposal for meeting this problem has involved the provision of a magnetic armature connected to the magnet and situated in an extension of the magnet tube to the side of the magnet remote from the float, together with a magnetic actuator which can be used to influence the armature through the extension wall to move the magnet and float and test the device. This is not entirely satisfactory for two reasons. First, the system has to be made larger to accommodate the tube extension, and, secondly, the armature may retain some magnetism and this may influence the co-operation between the magnet and the signal controls during normal operation.

In accordance with the present invention, in a float operated signalling device of the kind in which a magnet follows the movement of a float and is reciprocable in a non-magnetic tube which is arranged to be in communication with a liquid container, the magnet actuating signal controls on the outside of the tube wall; means are provided for supplying liquid to the end of the tube to the side of the magnet remote from the float, and the magnet, or a part attached to the magnet, which has a clearance from the tube wall so as not to impede the normal operation of the device, can act as an inefficient piston when liquid is supplied under pressure through the end of the tube so that the magnet is moved along the tube against the buoyancy of the float to test the device.

This arrangement commends itself in that the liquid supplied through the tube during the testing operation will enter the liquid container and this can be achieved by a simple redirection of the liquid feed to the container when testing is to be carried out. For example in the case of a boiler, the water will normally be pumped to the boiler by a pump through a conduit when replenishment is required. The pump may, for testing, supply the water through a valve to the end of the magnet tube, the valve being open to allow the water to flow through the tube into the boiler during testing. At other times the valve will be closed. The valve may be solenoid-operated, thus making remote controlled manual or automatic testing possible. In any case, the system remains completely sealed during testing.

There will need to be an adequate clearance between the magnet or other part forming the inefficient piston and the tube wall to avoid any danger of impeding the normal operation of the device. However when liquid is supplied under pressure to the end of the magnet tube, although the liquid will flow around the inefficient piston through the clearance, there will still be a pressure difference across the piston tending to force the piston and thus the magnet along the tube against the buoyancy of the float. This is sufficient to move the magnet relatively to the signal controls to perform the testing operation. As soon as the liquid ceases to be supplied to the end of the tube the pressure difference disappears and the magnet returns to its equilibrium position under the buoyancy of the float.

One example of a boiler installation incorporating a multiple level switch device in accordance with the present invention is illustrated in the accompanying drawings, in which.

Figure 1:
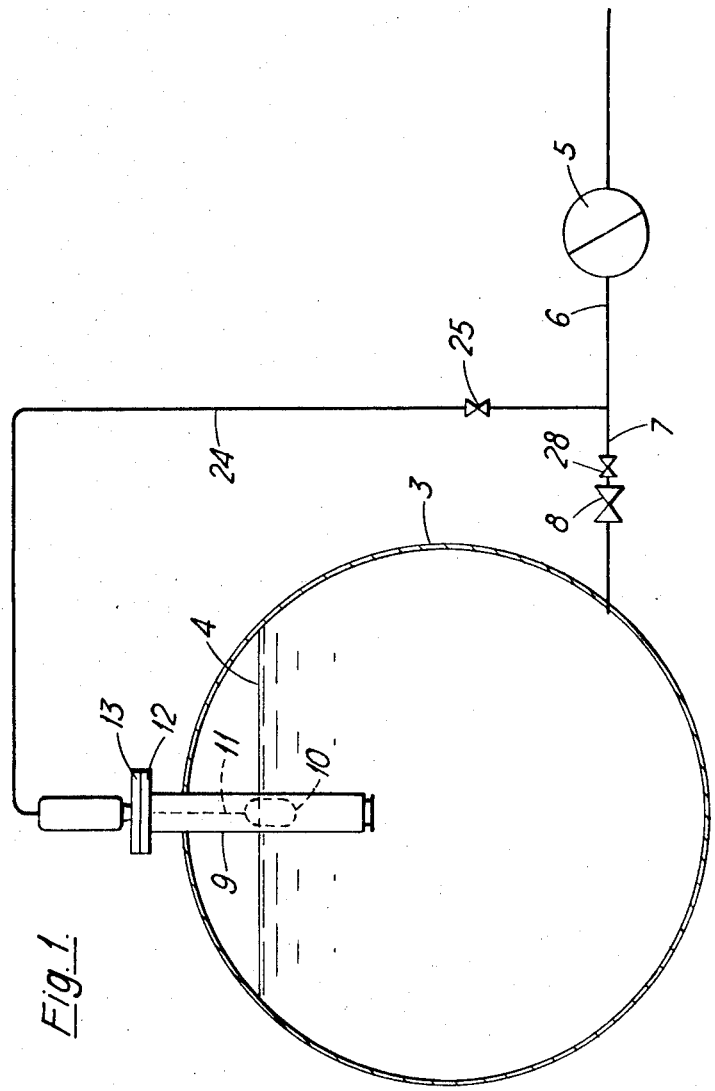
FIG. 1 is a diagrammatic elevation of the installation.

As shown in FIG. 1, the installation comprises a boiler 3 containing water 4 and arranged to be replenished by means of a pump 5 which pumps water through conduits 6 and 7 through a non return feed check valve 8 into the boiler.

The switch device comprises a cage 9 which is welded or otherwise sealed into the top wall of the boiler 3, and contains a float 10 on the lower end of a stem 11. The upper end of the cage 9 is provided with a flange 12 to which a closure plate 13 is bolted with the interposition of a gasket 14. The closure plate 13 supports a switch-housing 15 incorporating a non-magnetic stainless steel tube 16 the lower end of which has screwed onto it a centrally perforated guide 17. The stem 11 extends up through the central aperture in the guide 17 and into the tube 16 where it supports a permanent bar magnet 18.

Mounted inside the housing 15 and at fixed different heights alongside the tube 16 are two magnetically responsive switch units 19 and 20, although more than two units may be provided at choice. These units may be conventional magnetic reed switch units, or moving magnet switch units, such as that described in our British Patent Specification No. 1153297. The switch units 19 and 20 are connected by external leads to an appropriate indicating and/or automatic control system.

The cage 9 carries a baffle 21 spaced beneath its lower open end to inhibit rising bubbles from entering the cage and disturbing the float, and is provided with vent holes 22 above the upper water level to equalize the pressure within the cage and thus ensure that the liquid level remains the same inside and outside the cage. When the closure plate 13 and associated switch housing are undone and removed from the cage 9, the guide 17 prevents the magnet 18 from dropping right out of the tube 16.

Figure 2:
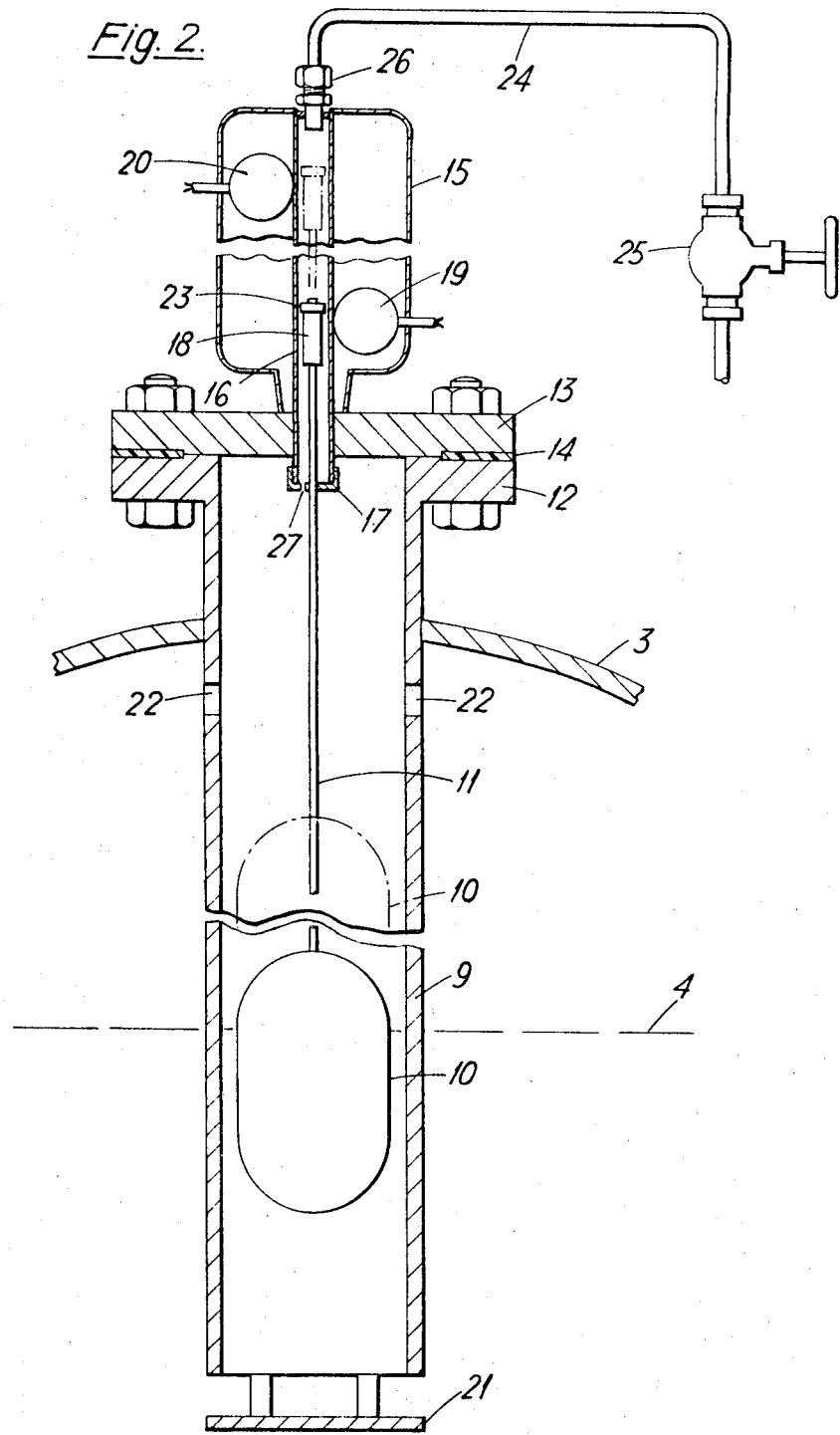
FIG. 2 is a section through the switch device.

In normal operation the magnet 18 rises and falls with the float 10 as the water level within the boiler 3 rises and falls. As the water in the boiler is driven off as steam, and the water level falls, the magnet 18 approaches the switch unit 19 and when the limiting lower level illustrated in full lines in FIG. 2 is reached the switch unit 19 is actuated. This actuation operates a warning to indicate to the operator that the boiler requires replenishment, or alternatively actuates an automatic control system. The pump 5 is started and water is pumped through the valve 8 into the boiler. As the water level in the boiler rises the float carries the magnet 18 up until the dotted line position in FIG. 2 is reached whereupon the switch unit 20 is actuated.

Actuation of the unit 20 provides a further indication to the operator that the replenishment is complete so that the water supply is cut off, or alternatively causes the automatic control system to stop the pump 5.

At intervals in use it is desirable to check the operation particularly of the lower level switch unit 19. For this purpose a phosphor bronze disc 23 is mounted on top of the magnet 18 and is held in position by the stem 11 which passes upwards through a central bore in the magnet 18 and through a central aperture in a disc 23 and is swaged over. The disc 23 has a clearance within the tube 16 so as not to impede the reciprocation of the magnet 18 within the tube. Also an auxiliary water supply conduit 24, incorporating a valve 25, leads from between the pump 5 and the check valve 8 to a coupling 26 at the upper end of the tube 16.

When it is required to test the operation of the switch unit 19, the pump 5 is started and the valve 25 is opened. The pressure drop across the feed check valve 8 is appreciable by virtue of a narrow orifice throttle 28 inserted on the pump side of the check valve 8. As a result some of the water is pumped under pressure through the conduit 24 and down through the tube 16. The disc 23 then acts as an inefficient piston, in that it does not completely prevent the passage of water through the annular space between the periphery of the disc 23 and the wall of the tube 16 and thus down through the cage 9 into the boiler, but, provided that the water is supplied under sufficient pressure, the pressure differential across the disc 23 and magnet 18 depresses the disc and magnet and hence dunks the float down below its buoyancy position in the water 4. The pressure is sufficient to cause the magnet 18 to reach the lower level position illustrated in full lines in FIG. 2 so that the switch unit 19 is actuated. Once the operator is satisfied with the test, the pump 5 is stopped and the valve 25 closed. Any water remaining in the top of the tube 16 then drains down past the disc 23 and through a drain 27 in the guide 17 into the boiler and the float and magnet adopt their equilibrium position.

We claim:

1. In a float operating signalling device of the kind comprising a liquid container, a non-magnetic tube which is arranged to be in communication with said liquid container, a float member in said liquid container, float responsive means including a magnet, which float responsive means in reciprocable in said tube and which is coupled to and follows movement of said float member, and signal controls on the outside of said tube wall and actuable upon movement of said magnet, the improvement according to which means are provided for supplying liquid to the end of said tube on the side of said magnet remote from said float member, and said float responsive means has a clearance from said tube wall sufficient to permit said float member to float freely during the normal operation of said device but small enough to cause said float responsive means to act as a piston when liquid is supplied under pressure through said end of said tube and move said magnet in response to said pressure along said tube against the buoyancy of said float member to test said device.

2. A device according to claim 1, wherein said float responsive means includes a part attached directly to said magnet.

3. A device according to claim 2, wherein said part attached directly to said magnet is a disc attached to the end of said magnet remote from said float member.

4. A device according to claim 1, wherein said tube is upright and said magnet is attached to the upper end of a stem to the lower end of which said float member is attached.

5. A device according to claim 4, wherein said float member moves upwards and downwards within a cage which is arranged to be fixed in position and said tube and signal controls are mounted on a removable closure for the upper end of said cage.

6. A device according to claim 1, wherein there are two sets of signal controls which are actuated individually when said magnet is at different positions along said tube.

7. A liquid container installation comprising a liquid container fitted with a signalling device according to claim 1, and a conduit which is connected to said end of said tube, said conduit being connected to a source of liquid under pressure and incorporating a check valve.

8. An installation according to claim 7, wherein said conduit is a branch from a main supply line for said container.

9. An installation according to claim 8, wherein said main supply line incorporates a non return check valve downstream of said conduit branch and a throttle between said check valve and said conduit branch.

* * * * *